United States Patent [19]

Jenkins

[11] Patent Number: 5,558,008
[45] Date of Patent: Sep. 24, 1996

[54] COMBINATION GRILL-WOK BARBECUE

[76] Inventor: Borden Jenkins, P.O. Box 2996, Corpus Christi, Tex. 78403

[21] Appl. No.: 455,225

[22] Filed: May 30, 1995

[51] Int. Cl.⁶ .................................................. A47J 33/00
[52] U.S. Cl. .......................... 99/340; 99/422; 126/25 R; 126/30; 248/150
[58] Field of Search ............................. 99/339, 340, 422, 99/450; 126/25 A, 25 AA, 25 R, 29, 30; 248/97, 121, 150, 151

[56] References Cited

U.S. PATENT DOCUMENTS

| | | | |
|---|---|---|---|
| 34,572 | 5/1901 | Langlois | 126/30 |
| D. 302,096 | 7/1989 | Anderson | D7/402 |
| D. 317,549 | 6/1991 | Stadelmaier | D7/360 |
| 1,530,815 | 3/1925 | Dear | 126/30 |
| 2,844,139 | 7/1958 | Lucas | 126/30 |
| 3,091,343 | 5/1963 | Neumann | 126/25 R |
| 3,667,449 | 6/1972 | Persinger | 126/25 R |
| 4,062,341 | 12/1977 | Panzarella | 126/41 R |
| 4,741,322 | 5/1988 | Lin | 126/25 R |
| 4,856,423 | 8/1989 | Burns | 126/30 |
| 4,896,651 | 1/1990 | Kott | 126/30 |
| 5,065,735 | 11/1991 | Bourgeois | 126/30 |
| 5,189,945 | 3/1993 | Hennick | 99/339 |
| 5,315,983 | 5/1994 | Law | 126/216 |

FOREIGN PATENT DOCUMENTS 23371 of 1893 United Kingdom ..................... 126/30

*Primary Examiner*—David Scherbel
*Assistant Examiner*—Terrence R. Till
*Attorney, Agent, or Firm*—David L. Baker; Rhodes & Ascolillo

[57] ABSTRACT

A Combination Grill Wok Barbeque has a circular steel plate with legs to raise the surface to table height. A post extends from the top surface and receives a tube sealed at one end. A steel ring is attached to the tube at one point on its circumference and is co-planar with the plate. The ring is designed to accommodate either a grill or a wok and support it over a heat source on the plate. The heat source may be either a propane burner or a charcoal fire in which case a wind shield is attached to the edge of the plate.

3 Claims, 5 Drawing Sheets

COMBINATION GRILL-WOK BARBECUE

BACKGROUND OF THE INVENTION

1. Field of the Invention

This invention is directed to barbecue grills and in particular to a portable barbecue grill that accommodates alternatively a wok cooking utensil and a combination hot plate and grill.

2. Description of the Need and the Prior Art

It is an American tradition to barbecue stakes, chops, hot dogs and hamburgers on the grill over a charcoal fire. More recently, the outdoor cookout around the swimming pool has begun to include other foods including those foods which are best cooked in the utensil called a wok. The Chinese wok involves cooking techniques using a minimum amount of fats and oils. At times vegetables and meats are cooked for a very short time at high heats. The typical stir-fly recipe calls for a cooking time of less then five minutes. Such rapid cooking combined with the use of small quantities of fat provides substantial health benefits because less fat is absorbed in the food compared with traditional Western style frying. In addition, the wok style of cooking tends to seal the flavor into the food, rendering it more appealing to the palate.

The wok is easily cleaned and readily reusable for cooking several items on the same menu. The rounded smooth metal surface may be wiped out or dumped for cleaning with little or no residue.

Although the wok has many culinary advantages because of its shape, it has fundamental instability problem because of its generally hemispherical shape and relatively small surface on which to rest. The wok was originally developed to be placed directly on hollowed-out sections of coals on the ground and/or on rings with a wide base fire built below. The wok does not adapt well to cooking on modern ranges and as a result a number of devices have been suggested as a substitute for the above mentioned hollowed-out section of coals on the ground.

A review of the most relevant prior art relating to this invention is found in the following U.S. Patents:

U.S. Design Patent No. Des. 302,096 issued Jul. 11, 1989 to Anderson for an adjustable wire rack for holding a wok on a barbecue grill.

U.S. Design Patent No. Des. 317,549 issued Jun. 18, 1991 to Stadelmaier for a camper's wok which is a completely spherical utensil with a frustro-conical base for support.

U.S. Pat. No. 4,062,341 issued Dec. 13, 1977 to Panzarella for a patio wok stove which is a cylindrically shaped chamber containing a source of energy and a heating chamber, over which the wok is suspended. The stove is capable of high temperature and is relatively insensitive to the wind, which increases the efficiency of the unit.

U.S. Pat. No. 5,189,945 issued Mar. 2, 1993 to Hennick discloses a water cooled barbecue grill where the grilling surface is cooled by circulating water from a reservoir. The invention shows a conventional type barbecue stand with a grill over a fire bowl and legs for support.

U.S. Pat. No. 5,315,983 issued May 31, 1994 to Law shows a wok support ring which is intended for use in a commercial setting. A conventional wok cylinder (2) sits over a gas burner (1) with the ring of the invention (3) resting on the top.

Well known existing art and the references cited, either taken alone or in combination fail to anticipate the invention disclose and claimed herein.

SUMMARY OF THE INVENTION

The invention is characterized by a circular steel plate of sufficient thickness to form a base for the device. Attached to one side of the plate are three poles that constitute legs and support the base at a height equivalent to the normal table top. Extending from the opposed side of the plate, near the edge is a single pole rising up to eighteen inches in height. A tube of selected length, sealed at one end is adapted to engage the pole and have sufficient clearance to rotate about it. Attached to the tube is a steel ring which is co-planar with the top surface of the plate. The ring, through the tube, will swing over and away from the top surface of the plate. The inside diameter of the ring is that which is necessary to support a wok utensil. In addition, the ring contains a number of retaining tabs around the inner perimeter which are adapted to support a conventional barbecue grill.

The wok or the grill are heated by means of either a conventional propane gas burner placed on the top surface of the steel plate or by a charcoal fire caused to be started directly on the steel plate. A removable wind guard is attached around the circumference of the plate for safety purposes when an open fire is used. The cooking temperature is controlled by means of moving the ring over and away from the fire. After the charcoal is extinguished and cooled the wind guard is removed and the ashes are brushed into a suitable container. The plate top is unobstructed and easily cleaned.

It is therefore an object of the invention to provide a new and improved combination grill-wok barbecue.

It is another object of the invention to provide a new and improved combination grill-wok barbecue that is capable of using multiple fuels.

It is a further object of the invention to provide a new and improved combination grill-wok barbecue that is easily assembled, disassembled and stored.

It is still another object of the invention to provide a new and improved combination grill-wok barbecue that is safe, easy to use and easily cleaned after use.

It is still a further object of the invention to provide a new and improved combination grill-wok barbecue which is of a durable and reliable construction.

It is another object of the invention to provide a new and improved combination grill-wok barbecue which may be easily and efficiently manufactured and marketed.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DETAILED DESCRIPTION OF A PREFERRED EMBODIMENT

Figure 1:
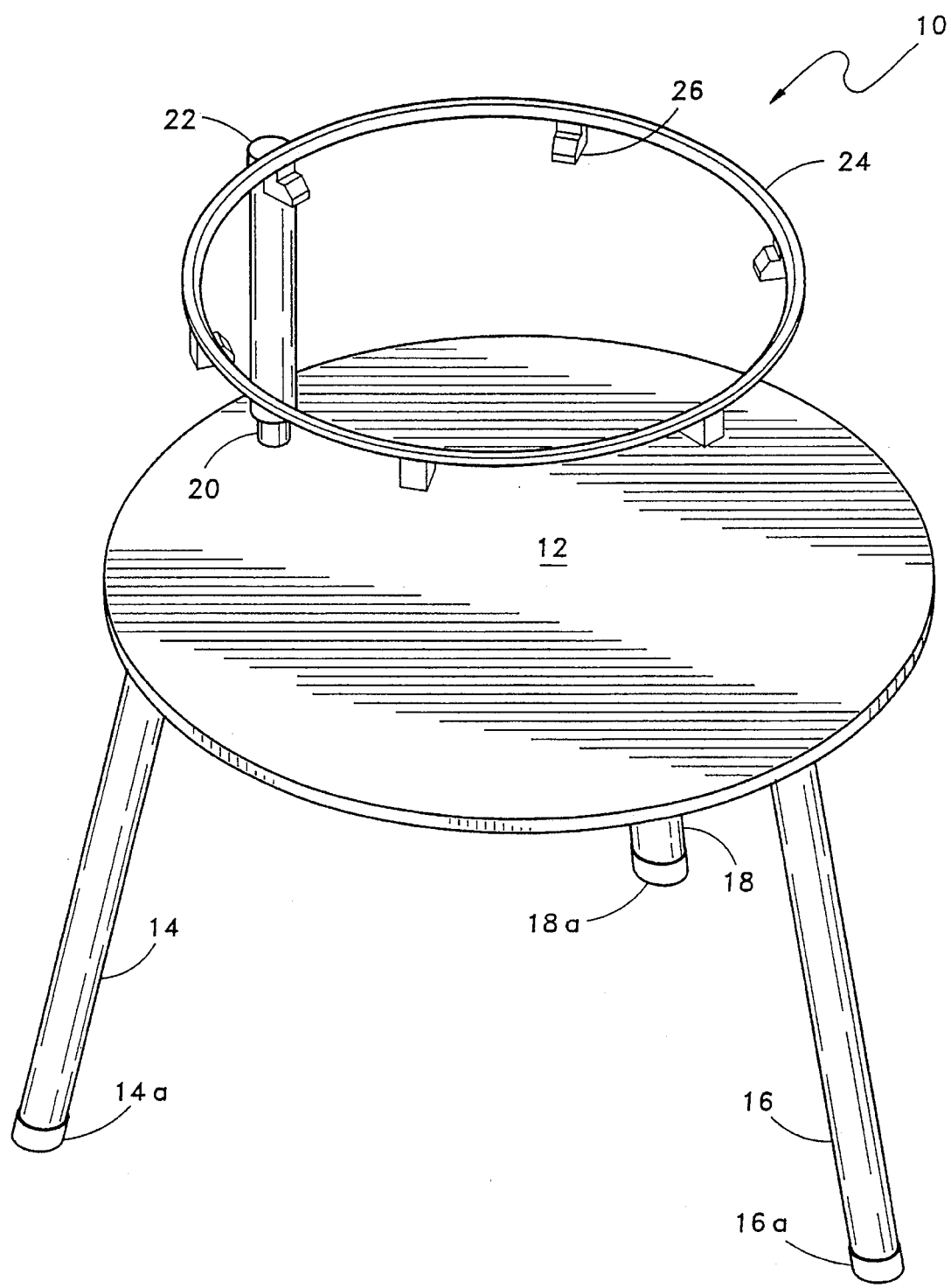
FIG. 1 is a perspective view of the invention.

Referring now to FIG. 1, the invention is shown generally at 10 and consists of a circular steel plate 12 with three legs 14,16 and 18 removably attached to the bottom surface. The legs include protective caps 14a,16a and 18a attached distally for the protection of floors and decks from the imprint of the legs caused by the weight of the heavy steel plate. Extending above the plate 12 is a post 20 which is removably attachable to the plate 12. A tube 22 adapted to slide over the post 20 supports a ring 24. The ring 24 is sized to allow a wok to be engaged and supported over a source of heat which is contained on the plate 12. A plurality of tabs 26 extend from the ring and provide support for a grill which may be substituted for the wok.

Figure 2:
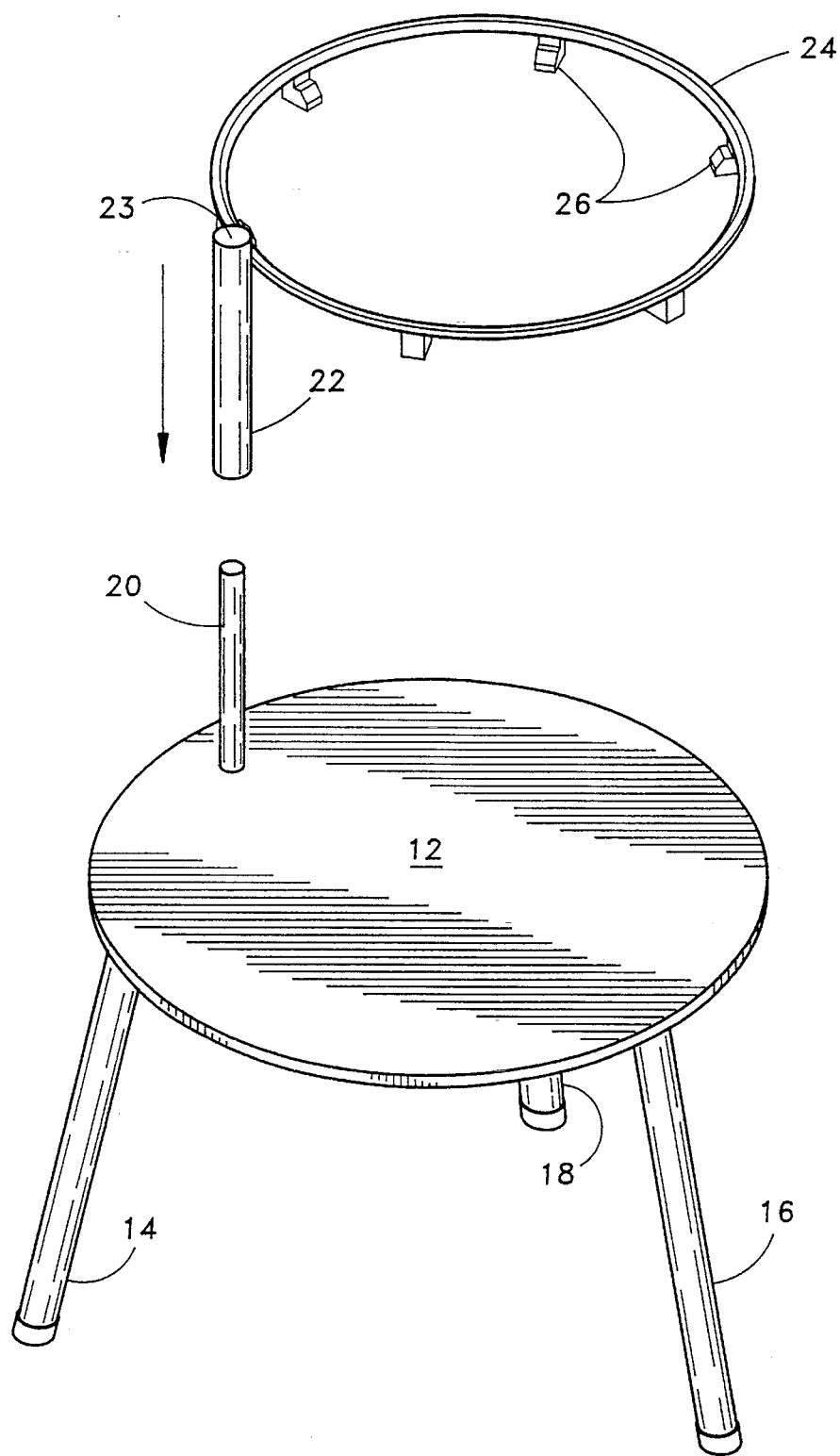
FIG. 2 is a top perspective view of the invention exploded in part.
Figure 3:
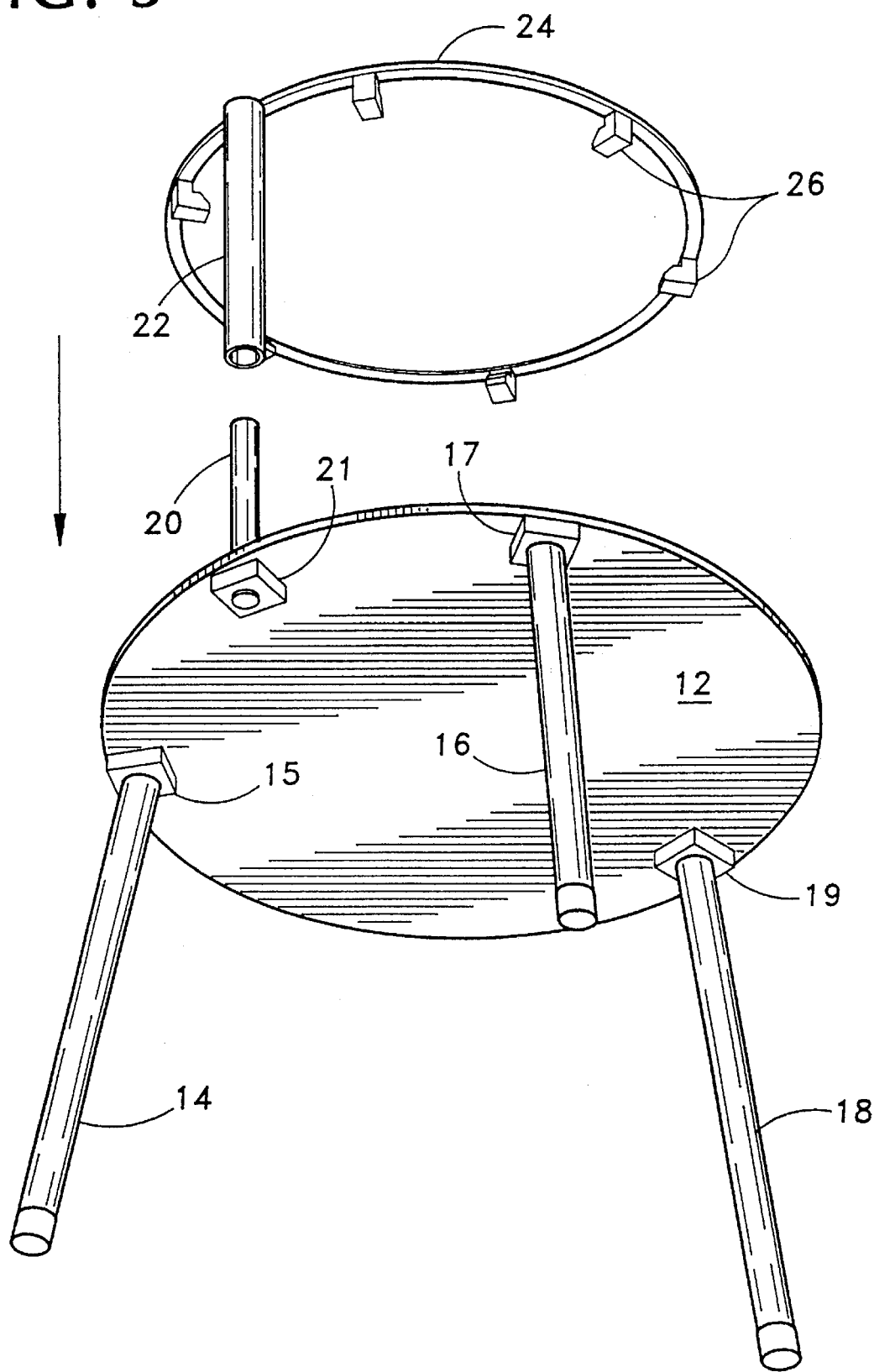
FIG. 3 is a bottom perspective view of the invention exploded in part.

Concerning FIGS. 2 and 3 the tube 22 is shown with closed end 23 removed from the post 20. The post 20 is threadingly connected to the plate 12 and is secured through the plate 12 to a nut 21 welded to the underside of the plate. The tube 22 and consequently the ring 24 is provided with a loose friction fit over the post and easily rotates over and away from the center of the plate. The plate is of sufficient weight that the ring and its contents may be rotated 180 degrees from the plate center without the possibility of upsetting the plate. The posts 14,16, and 18 that serve as legs are threadingly attached to the underside of the plate by nuts 15,17 and 19 which are welded to the underside of the plate.

Figure 4:
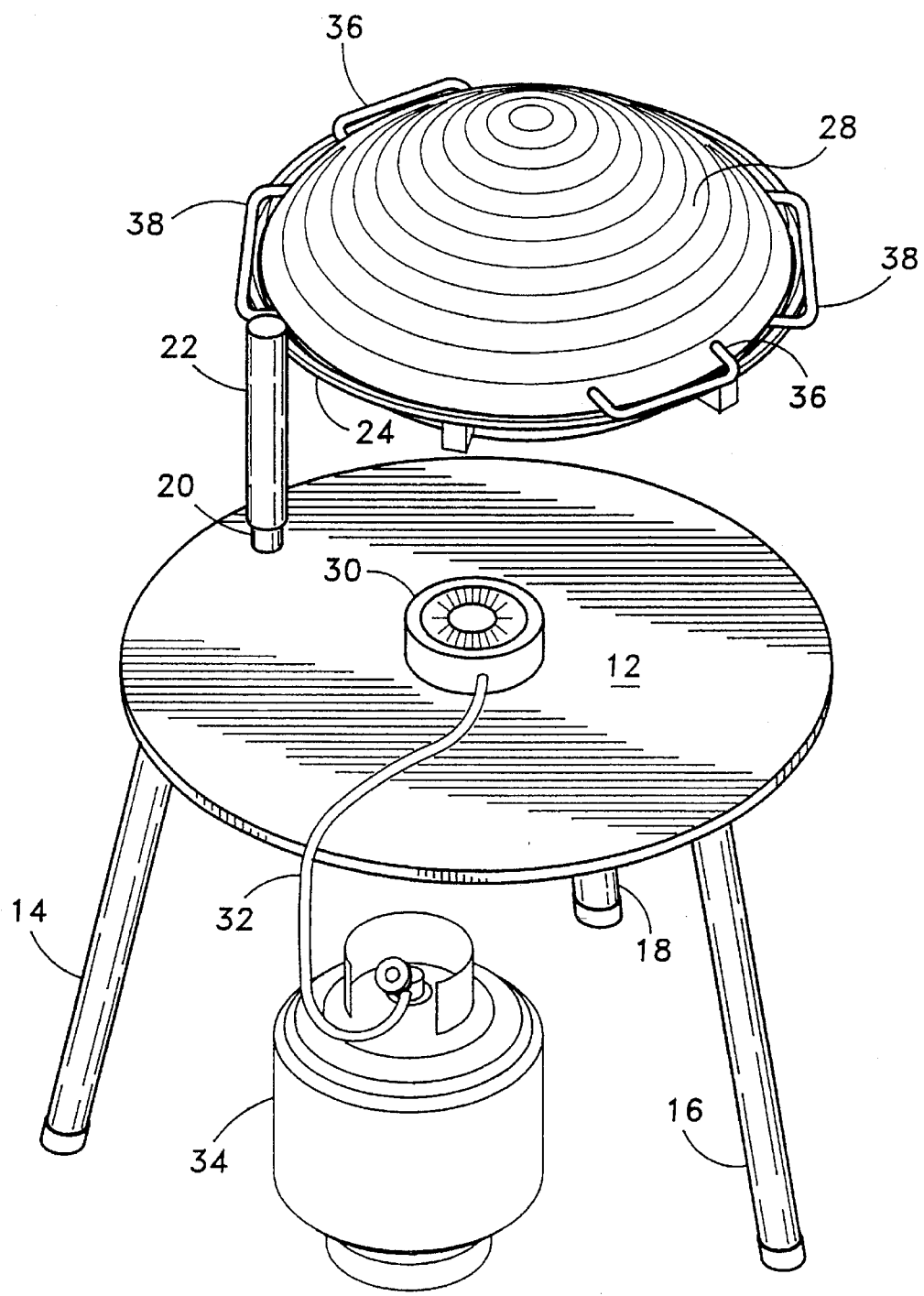
FIG. 4 is a top perspective view showing a wok.

FIG. 4 shows a covered wok 28 supported by the ring 24. A source of heat is shown on the plate in the form of a gas burner 30 connected to a hose 32 leading to a propane gas bottle 34. The wok and the gas burner are spaced sufficiently close that heat generated from the gas burner will effectively cook the contents of the wok. Handles 36 on the cover allow safe removal of the cover, while handles 38 on the body of the wok allow it to be safely removed from the ring. The width of ring 24 is sufficient that when combined with the slope of the surface of the wok, tabs 26 are not in contact with the wok when placed in the ring.

Figure 5:
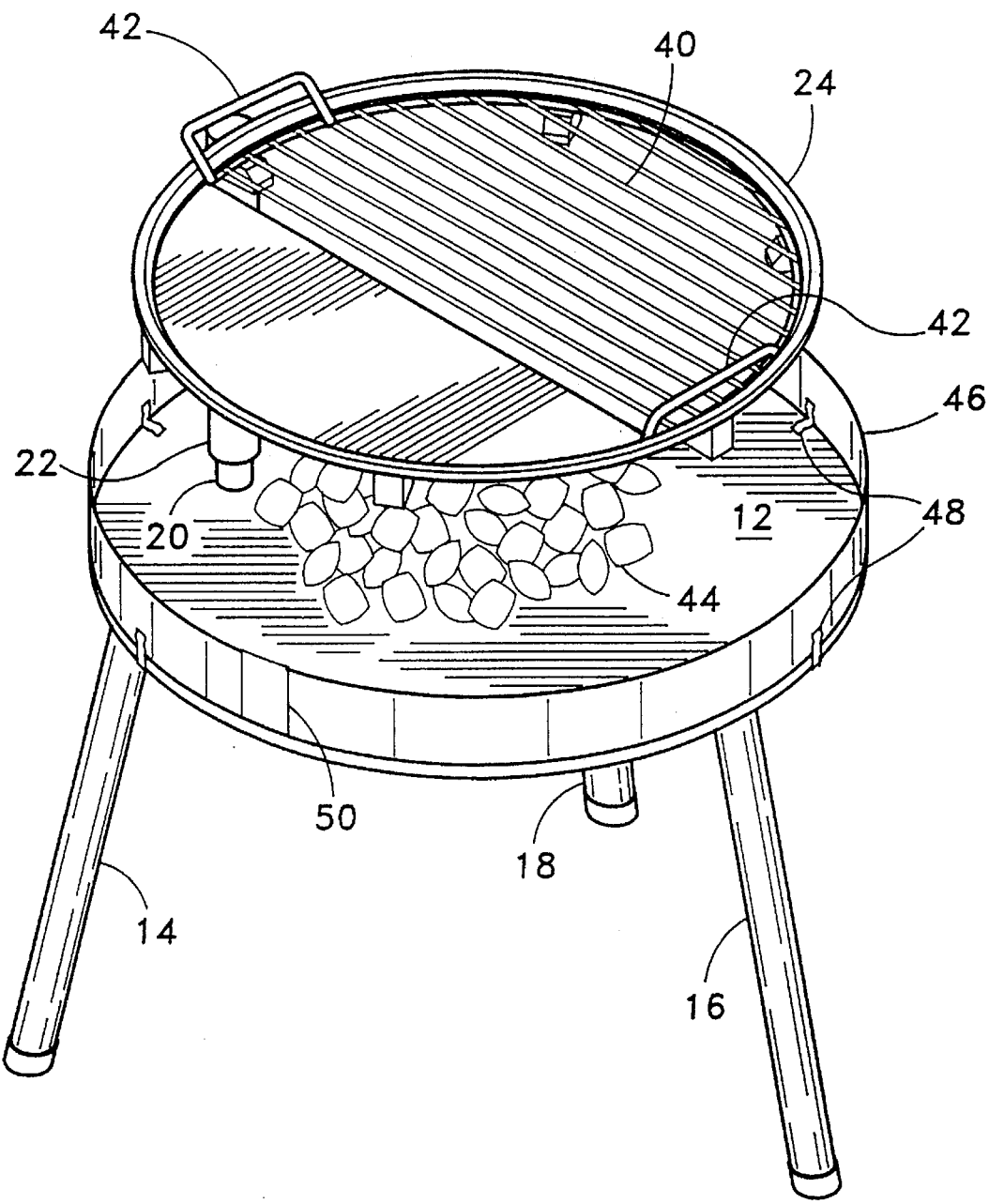
FIG. 5 is a top perspective view showing a grill.

Concerning FIG. 5, a barbecue grill 40 is shown suspended by tabs 26 in the ring 24 over the plate 12. Handles 42 allow the grill to be conveniently removed. A source of heat is provided in the form of a charcoal fire 44 located directly on the plate 12. The charcoal fire is protected from the wind by a removable shield of light metal 46 approximately two inches in width which attaches to the perimeter of the plate by spring clips 48. The ends of the wind shield are connected by a common and well known method of connecting sheet metal 50 and allows the shield to resume a linear shape when not in use. When the fire is out and the ashes cooled the plate may be cleaned by sweeping the contents into a suitable container.

The heat source is immaterial to which utensil is used, the wok or the grill. The gas burner works effectively with the wok and the grill and the charcoal works effectively with the wok and the grill.

The invention is particularly convenient to store in the off season. The legs and the top post are easily unscrewed and the wind shield linearizes so that all parts of the invention will fit into a small compact area away from view.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A combination grill-wok and heat source support device, capable of resting on a permanent surface such as a floor, comprising:

a steel plate;

a surface on the plate;

a circumference on the plate;

a plurality of removable legs for supporting the plate connected to the steel plate above the permanent surface;

the removable legs are threadedly connected to the steel plate;

post means removably extending from the surface on the steel plate;

the post means is threadedly connected to the steel plate;

tube means telescopingly engaging the post means;

an end on the tube means;

the tube means, sealed at the end, engaging the post means in a loose friction fit;

a circumference on the tube means;

a point on the circumference;

a steel ring attached at the point on the circumference on the tube means;

the ring comprising a plurality of tabs extending into the ring for supporting the wok-grill; and the steel ring being in a spaced co-planar relation with the plate, whereby the heat source placed on the steel plate will warm the grill-wok and placed within the steel ring;

a removable wind shield means, attachable to the circumference of the plate for protecting the heat source from a wind;

the wind shield means comprising:

a rectangular member;

a first end on the member;

a second end on the member; and a fastener attached to the member to releasably connect the first end to the second end.

2. A combination grill-wok and heat source support device according to claim 1 wherein the heat source is a propane gas burner.

3. A combination grill-wok and heat source support device according to claim 1 wherein the heat source is a charcoal fire.

\* \* \* \* \*